(12) United States Patent
Hajjar et al.

(10) Patent No.: US 10,303,416 B2
(45) Date of Patent: *May 28, 2019

(54) PORTABLE DISPLAY

(71) Applicant: PRYSM, Inc., San Jose, CA (US)

(72) Inventors: Roger A. Hajjar, San Jose, CA (US);
John L. Ritter, Harvard, MA (US);
David Kindler, Concord, MA (US);
Jahja I. Trisnadi, Cupertino, CA (US)

(73) Assignee: PRYSM, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,158

(22) Filed: Oct. 4, 2016

(65) Prior Publication Data

US 2017/0024181 A1 Jan. 26, 2017

Related U.S. Application Data

(63) Continuation of application No. 13/735,407, filed on Jan. 7, 2013, now Pat. No. 9,469,080.

(Continued)

(51) Int. Cl.
| | |
|---|---|
| *G06F 3/14* | (2006.01) |
| *B32B 3/18* | (2006.01) |
| *G02B 27/14* | (2006.01) |
| *G02B 5/20* | (2006.01) |
| *B32B 3/28* | (2006.01) |
| *B32B 3/02* | (2006.01) |
| *B32B 27/08* | (2006.01) |
| *B32B 27/30* | (2006.01) |
| *B32B 27/36* | (2006.01) |

(Continued)

(52) U.S. Cl.
CPC .............. *G06F 3/1446* (2013.01); *B32B 3/02* (2013.01); *B32B 3/18* (2013.01); *B32B 3/28* (2013.01); *B32B 27/08* (2013.01); *B32B 27/308* (2013.01); *B32B 27/36* (2013.01); *G02B 5/201* (2013.01); *G02B 5/204* (2013.01); *G02B 27/141* (2013.01); *G09G 3/02* (2013.01); *G09G 3/2003* (2013.01); *B32B 2307/412* (2013.01); *B32B 2457/20* (2013.01); *G09G 2300/026* (2013.01); *Y10T 428/239* (2015.01); *Y10T 428/24628* (2015.01); *Y10T 428/249921* (2015.04)

(58) Field of Classification Search
CPC .......... G06F 3/1446; B32B 3/18; B32B 3/28; B32B 27/308; B32B 27/36; G02B 5/201; G02B 5/204; G02B 27/141; G09G 2300/026
USPC .................................................. 359/557–590
See application file for complete search history.

(56) References Cited

U.S. PATENT DOCUMENTS

| | | |
|---|---|---|
| 3,861,783 A | 1/1975 | Dill et al. |
| 5,146,355 A | 9/1992 | Prince et al. |

(Continued)

*Primary Examiner* — Kristina M Deherrera
(74) *Attorney, Agent, or Firm* — Patterson & Sheridan, LLP; Steven Versteeg

(57) ABSTRACT

In one embodiment, the modular display includes aggregates of individual panel tiles arranged between two large plastic sheets. The footprint of the large plastic sheet sandwich becomes the dimension of the display screen. The tilettes are phosphor emission panels with a full complement of emittable pixels. By separating the tilettes from the final full dimension sheet, the tilettes can be manufactured in transportable sizes and the outer full dimension sheets can be rolled for easy transport to the final install location.

20 Claims, 7 Drawing Sheets

Related U.S. Application Data

(60) Provisional application No. 61/584,133, filed on Jan. 6, 2012.

(51) Int. Cl.
  *G09G 3/02* (2006.01)
  *G09G 3/20* (2006.01)

(56) References Cited

U.S. PATENT DOCUMENTS

| | | | |
|---|---|---|---|
| 5,805,117 | A | 9/1998 | Mazurek et al. |
| 7,091,927 | B1 | 8/2006 | Hagge et al. |
| 8,587,187 | B2 | 11/2013 | Cho |
| 9,469,080 | B2 * | 10/2016 | Hajjar .................... G02B 5/201 |
| 2009/0033222 | A1 * | 2/2009 | Park ....................... G02B 5/282 |
| | | | 313/582 |
| 2011/0298692 | A1 | 12/2011 | De Loore et al. |
| 2011/0305000 | A1 | 12/2011 | Bukesov et al. |

* cited by examiner

PORTABLE DISPLAY

CROSS-REFERENCE TO RELATED APPLICATIONS

This application is a continuation application of co-pending U.S. patent application Ser. No. 13/735,407, filed on Jan. 7, 2013, which claims benefit of U.S. Provisional Patent Application Ser. No. 61/584,133, filed Jan. 6, 2012 which is herein incorporated by reference in its entirety.

BACKGROUND

Field

Embodiments of the present invention generally relate to a portable display. More particularly, embodiments of the invention relate to a modular portable display.

Description of the Related Art

There are two main ways to make larger displays. One way is to make the current technologies in larger footprints. As an example an LCD display can be made larger with a larger glass and appropriate manufacturing to use the larger glass for building the larger LCD arrays. However, the larger glass is more expensive to manufacture, heavier to handle, more fragile and becomes more difficult to maneuver in tighter passageways when bringing the larger display to its final destination.

The other main display technology is tile based, which permits easy transport as each tile can be uniquely transported, then arranged in an array to produce a large screen display. Here the problem is that the gaps between the tiles are noticed creating a visual image gap between each tile.

SUMMARY

Embodiments of the present invention generally relate to a modular tile display system that is not only portable, but when assembled results in a seamless large display.

In one embodiment, the modular display includes aggregates of individual panel tiles or "tilettes" arranged between two continuous outer visible light transparent containment sheets. The footprint of the continuous outer containment sheet sandwich becomes the dimension of the display screen. The tilettes are phosphor image emission modules with a full complement of emittable pixels. By separating the tilettes from the final full dimension outer containment sheet, the tilettes can be manufactured in transportable sizes and the outer full dimension containment sheets can be rolled for easy transport to the final install location.

In one embodiment, an apparatus is provided. The apparatus comprises a plurality of image emission modules each comprising multiple phosphor regions, wherein at least one phosphor region emits light of a first color when excited and at least one phosphor region emits light of a second color when excited and a visible light transparent support structure comprising a first visible light transparent sheet and a second visible light transparent sheet, wherein the plurality of image emission modules are placed in between the first and second visible sheets and the apparatus has a continuous concave bend.

In another embodiment, an apparatus is provided. The apparatus comprises a plurality of image emission modules each comprising multiple phosphor regions, wherein at least one phosphor region emits light of a first color when excited, and at least one alternate phosphor region emits light of a second color when excited and a visible light transparent support structure comprising a first visible light transparent sheet and a second visible light transparent sheet, wherein the plurality of image emission modules are positioned adjacent to each other between the first visible light transparent sheet and the second visible light transparent sheet, and wherein the center of the adjacent positioned plurality of image emission modules and the center of the first and second visible transparent sheets are substantially centered to each other.

In yet another embodiment, a method for making a portable display screen is provided. The method comprises positioning a plurality of image emission modules on a first visible light transparent sheet, wherein the plurality of image emission modules comprise multiple phosphor regions, wherein at least one phosphor region emits light of a first color when excited and at least one phosphor region emits light of a second color when excited, positioning a second visible light transparent sheet over the plurality of image emission modules and the first visible light transparent sheet to form a sandwich structure, and simultaneously bending the sandwich structure such that the bowed visible light transparent sheets apply a normal load to the plurality of image emission modules.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
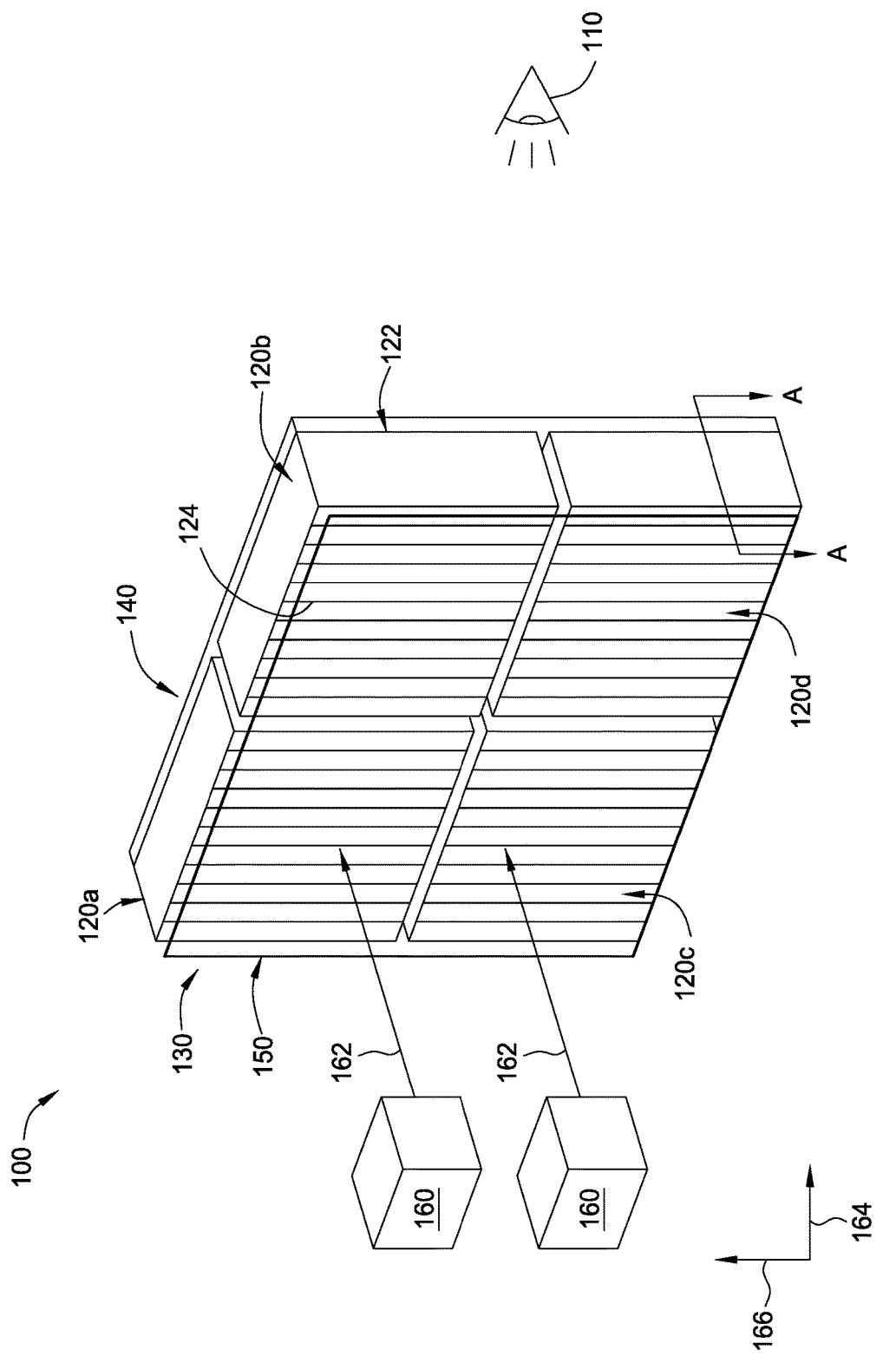
FIG. 1 illustrates a perspective schematic diagram of one embodiment of a display system according to embodiments described herein.

Embodiments of the present invention relate to a modular display that is light weight and flexible enough to be brought into smaller passageways such as doorways. The modular display may be assembled into a large display with the same resolution as displays of smaller sizes.

In one embodiment, the modular display includes tilettes inserted between two visible light transparent sheets that are either bent to about 5 degrees to hold the tile panels in place. In certain embodiments, the visible light transparent sheets may be clamped together. Distinct phosphor tilettes of a common polymer coefficient of thermal expansion ("CTE") are arranged within a single polymer sandwich to provide a true seamless large and transportable display. The phosphor tilettes may be arranged to abut against each other such that the abutment causes the spacing between adjacent tilettes to be on the order of the pixel pitch thus there appears to be no seam gap between phosphor tilettes.

In one embodiment, the modular display includes an array of individual panel tiles or "tilettes" arranged between two continuous outer visible light transparent containment sheets. The footprint of the continuous outer containment sheet sandwich becomes the outer dimension of the display screen. The footprint of the continuous outer containment sheet may be as large as the outer dimension of the array of individual tilettes or larger than the outer dimension of the array of individual tilettes. The tilettes are phosphor image emission modules with a full complement of emittable pixels. By separating the tilettes from the final full dimension visible light transparent outer containment sheet, the tilettes can be manufactured in transportable sizes and the outer full dimension visible light transparent containment sheets can be rolled (and being plastic are light weight) for easy transport to the final install location.

As used herein, the terms "tilette," "panelette," "panel stack," "panel tiles," an image emission module may refer to the individual servo/phosphor/contrast layer panels, which can be placed together side-by-side to create a large panel tilette array. Tilettes may be composed of the standard layers of a Laser Phosphor Display panel. The tilettes may include a Fresnel lens layer which normalizes the angled incident excitation beams to the panel; a servo layer, which in conjunction with the servo beam permits the detected reflected beam to guide positioning and timing information to the excitation drivers and beam positioners; a co-extruded dichroic filter layer, which passes excitation light and reflects visible light; a phosphor layer, which has a repeating structure of distinct colored light emitting phosphors; a standoff layer, which physically separates the phosphor layer from the next layer; a color filter layer, which permits only the intended light to the pass from the phosphor layer to the viewer; and a UV block layer that filters any remaining excitation light from passing through to the viewer. The tilette array may be held together in a manner described below and as a whole may be attached to a framing structure, which also holds the light engines.

FIG. 1 is a perspective schematic diagram of a display system 100, according to embodiments of the invention. The display system 100 is a light-based electronic display device configured to produce video and static images for a viewer 110 using light-emitting phosphors. For example, the display system 100 may be a laser-phosphor display (LPD), a light-emitting diode (LED) digital light processing (DLP), or other phosphor-based display device. As depicted in FIG. 1, the display system 100 comprises a plurality of image emission modules 120a-d that form an image mission module array and a visible light transparent support structure 130 for supporting the plurality of image emission modules 120a-d that are arranged to form a single tiled display screen. The visible light transparent support structure 130 comprises a first visible light transparent sheet 140 and a second visible light transparent sheet 150. It should be noted that although four image emission modules 120a-d (hereinafter 120) are depicted in FIG. 1, any plurality of image emission modules may be used with the embodiments described herein.

Each image emission module 120 has a display screen 122 with phosphor regions 124 that may be phosphor stripes, phosphor dots or other arrangements of the phosphors. The display system 100 further comprises a light engine 160 that is used to produce one or more scanning laser beams 162 to excite the phosphor material on the screen 122. The light engine 160 may include multiple laser beams selected from the group consisting of one or more of an excitation lasers, one or more servo feedback lasers, and combinations thereof. The lasers may be configured with appropriate focus and scanning mechanisms and optics. The light engine 160 is typically arranged to associate with a corresponding image emission module. Although a single light engine 160 is shown, generally there is one light engine per image emission module, though it is possible for a single light engine to excite more than one image emission module, for example, the associated image emission module and one or more adjacent image emission modules.

The phosphor regions 124 are made up of alternating phosphor regions of different colors, e.g., red, green, and blue, where the colors are selected so that they can be combined to form white light and other colors of light. The scanning laser beam 162 is a modulated light beam that includes optical pulses that carry image information and is scanned across screen 122 along two orthogonal directions, e.g., horizontally (parallel to arrow 164) and vertically (parallel to arrow 166), in a raster scanning pattern to produce an image on the screen 122 for the viewer 110. In some embodiments, the modulated light beam is caused by modulating the laser directly in one or both of pulse code or pulse width modulations. In some embodiments, the scanning laser beam 162 includes visible lasers beams of different colors that discretely illuminate individual pixel elements of the screen 122 to produce an image. In other embodiments, the scanning laser beam includes invisible laser beams, such as near-violet or ultra-violet (UV) laser beams that act as excitation beams to excite phosphors on the screen. In such embodiments, the scanning laser beam 162 is directed to discrete pixel elements that are formed from phosphor regions 124 or to portions of the phosphor regions 124 that act as discrete pixel elements and are made up of light-emitting material that absorbs optical energy from the scanning laser beam 162 to emit visible light and produce an image. Alternatively, the scanning laser beam 162 comprises hybrid visible and invisible lasers. For example, a blue laser can be used to generate blue color on screen 122, and the same blue laser could be used to excite phosphors that emit red and green light when excited. Alternatively, a UV laser may be used to excite phosphors that emit green light when excited, and a red and blue laser may be used to produce red and blue color directly on the screen 122.

The visible light transparent support structure 130 comprises a first visible light transparent sheet 140 and a second transparent visible light transparent sheet 150. As depicted in FIG. 1, the first visible light transparent sheet 140 and the second visible light transparent sheet 150 are positioned on opposite sides of the image emission modules 120a-120d holding the image emission module array together between the two sheets 140, 150. The first visible light transparent sheet 140 and the second visible light transparent sheet 150 may comprise sheets that are of a relatively stiff material.

The first visible light transparent sheet 140 and the second visible light transparent sheet 150 may be larger in length and width than the image emission module array. The sheets 140, 150 may be bolted together, bonded together, clamped together and/or held together using a slight pressure from the sides which may cause the sheets to bow.

The first visible light transparent sheet 140 and the second visible light transparent sheet 150 may comprise any material having suitable optical clarity, rigidity, toughness, and UV yellowing resistance. The material should also have the suitable stiffness, creep resistance (i.e. slow deformation under constant load), CTE, low anisotropy, and low coefficient of humidity expansion. In certain embodiments, the coefficient of friction may be a factor. In certain embodiments, the first visible light transparent sheet 140 and the second visible light transparent sheet 150 each comprise acrylic sheets, e.g., Plexiglas. In certain embodiments, the first visible light transparent sheet 140 and the second visible light transparent sheet 150 are each independently selected from materials comprising polyethylene terephthalate (PET), polyethylene naphthalate (PEN), polyolefins, polyamide, poly(oxymethylene) (POM), poly(methyl methacrylate) (PMMA), polycarbonate and combinations thereof. The first visible light transparent sheet 140 and the second visible light transparent sheet 150 may each have a thickness independently selected from about 1.0 millimeter to about 6.0 millimeters. The first visible light transparent sheet 140 may have a thickness from about 1.5 millimeters to about 3.0 millimeters, the second visible light transparent sheet 150 has a thickness from about 4.5 millimeters to about 6.0 millimeters.

Figure 2:
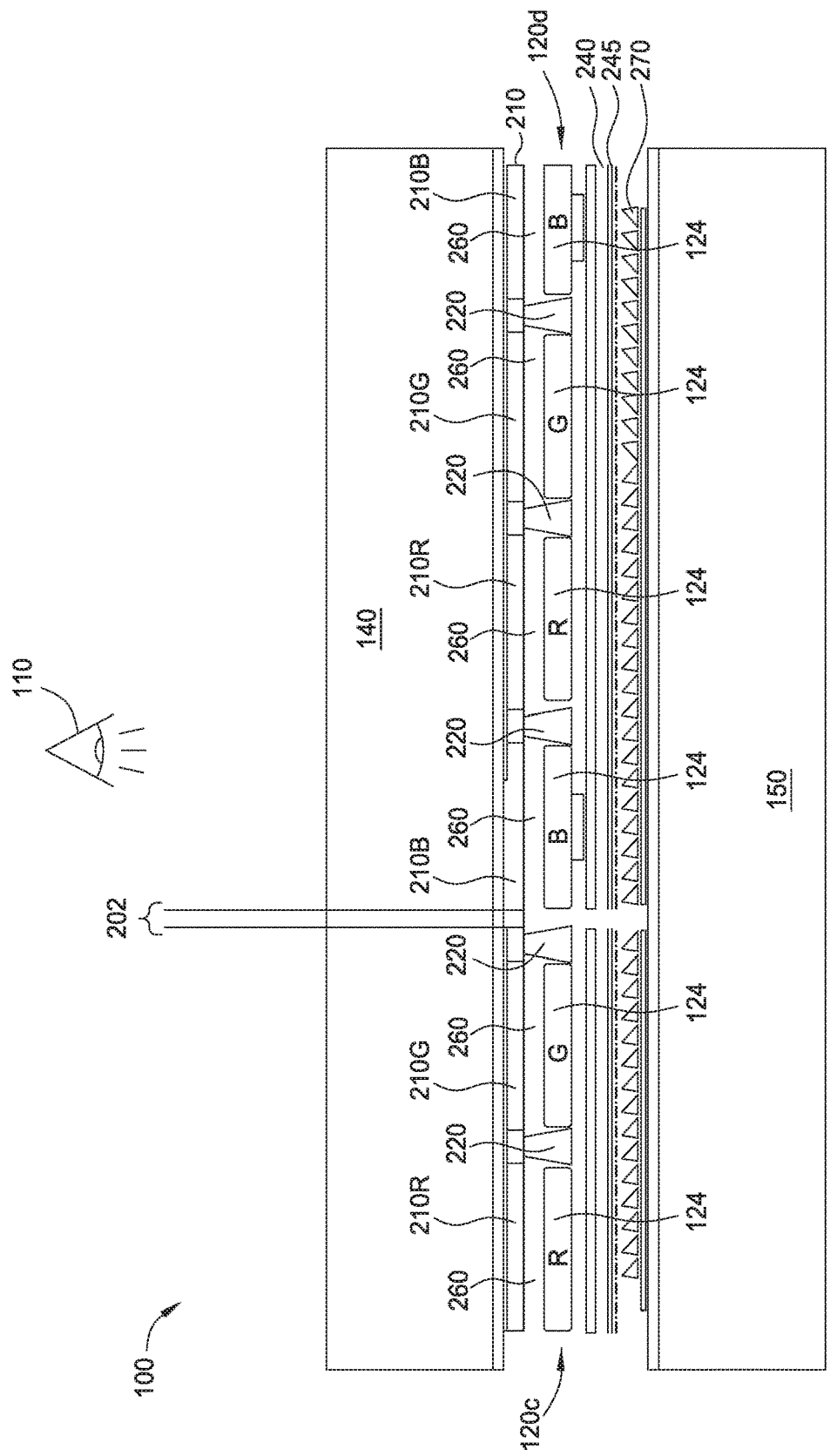
FIG. 2 illustrates a partial cross-sectional view of the display system taken at section A-A of FIG. 1 according to embodiments described herein.

FIG. 2 illustrates a partial cross-sectional view of the display system 100 taken at section A-A of FIG. 1. FIG. 2 illustrates two separate image emission modules 120c, 120d or "tilettes" with a tilette gap 202 defined in between the two image emission modules 120c, 120d. Each image emission module may include an optional color filter layer 210, phosphor regions 124 mounted on a thin transparent substrate 240, and standoff dividers 220. The color filter layer 210 is positioned on the side of screen 122 facing the viewer 110, the transparent substrate 240 is positioned on the opposite side of the screen 122, and the phosphor regions 124 are disposed between the color filter layer 210 and the transparent substrate 240 as shown.

Color filter layer 210 may be a thin substrate, such as a 1 mm substrate, and may be configured with filter elements 210R, 210G, and 210B that each transmit light of one particular color. The substrate may be a plastic or glass. In some embodiments, the color filter layer 210 is a structurally rigid or semi-rigid plate, and in other embodiments, color filter layer 210 is a relatively flexible substrate or sheet that is held in place by other structural elements of screen 122. In the embodiment illustrated in FIG. 2, color filter layer 210 includes red, green, and blue filter elements, which are positioned to align with a corresponding red, green, or blue phosphor regions 124, denoted by R, G, and B, respectively. The filter elements 210R, 210G, and 210B may be formed with a lithographic process on the requisite portions of the color filter layer 210 prior to the assembly of screen 122. In the embodiment illustrated in FIG. 2, the filter elements 210R, 210G, and 210B are configured as elongated strips (perpendicular to page) that, like the phosphor regions 124 and the standoff dividers 220, extend vertically across screen 122, i.e., parallel to arrow 166 in FIG. 1.

The standoff dividers 220 separate the phosphor regions 124 from each other and prevent the color filter layer 210 from touching the phosphor regions 124. Thus, the standoff dividers 220 form a gap 260 around each of the phosphor regions 124. One example material for the standoff dividers 220 is a photosensitive resin. The photosensitive resin may be applied as an imageable photo-resist laminate to a substrate, such as the color filter layer 210 or other planar structural member, and selectively exposed to the requisite light energy, such as UV light. When patterned appropriately, the standoff dividers 220 can be formed in the desired regions on the substrate and the remainder of the photo-resist laminate removed. As shown, the standoff dividers 220 may be formed to have walls that are angled, i.e., not normal to the transparent substrate 240 or the color filter layer 210. In some embodiments, the standoff dividers 220 are configured as elongated strips positioned between the phosphor regions 124. In one embodiment, the standoff dividers 220 have a height of between about 50 and 100 µm.

The phosphor regions 124 are configured to emit light of one color when excited by an excitation beam, such as the scanning laser beam 162. Thus, each pixel element of the screen 122 may include one or more phosphor regions 124, where each phosphor region 124 acts as a subpixel of a larger pixel element. In the embodiment illustrated in FIG. 2, one dimension of a pixel element, i.e., pixel width, is defined by the width of three phosphor regions 124, and the orthogonal dimension, i.e., out of the page, or vertical, is defined by the excitation laser beam spot size. In such an embodiment, where the phosphor regions 124 are continuous stripes, the vertical position of each pixel element is not fixed and may be selected as desired by adjusting the vertical position at which the excitation laser beam is directed to each phosphor region 124. In other embodiments, the standoff dividers 220 may define both dimensions of each phosphor region 124, so that phosphor regions 124 are separated on all sides from adjacent phosphor regions by the standoff dividers 220 formed in a grid pattern. In one embodiment, each of the phosphor regions 124 is spaced at a pitch of 500 µm to 550 µm, so that the pixel width of a pixel element on screen 122 is on the order of about 1500 µm. In other embodiments, each of the phosphor regions 124 is spaced at a pitch of about 180 µm to 220 µm, so that the pixel width of a pixel element on screen 122 is on the order of about 600 µm. In yet other embodiments, the pixel elements of the screen 122 may include separate phosphor regions rather than portions of phosphor regions 124. For example, each subpixel may be a discrete and isolated phosphor dot or rectangle of one particular light-emitting phosphor material.

The transparent substrate 240 is a thin, semi-rigid material that is transparent to UV and visible light and has an index of refraction that is relatively close to that of the phosphor regions 124. Because the index of refraction of transparent substrate 240 is selected to be approximately equal to the index of refraction of the phosphor regions 124, the transparent substrate 240 and the phosphor regions 124 are optically coupled, and light leaving the phosphor regions 124 passes into the transparent substrate 240 rather than reflects off the interface between the transparent substrate 240 and the phosphor regions 124. Other desirable characteristics for the transparent substrate 240 include having a low coefficient of thermal expansion and low moisture absorption, and being readily manufacturable in thin layers. In addition, the transparent substrate 240 is preferably comprised of a material that is not brittle and does not break-down with exposure to UV light and discolor over the lifetime of the display system 100. In some embodiments, the transparent substrate 240 comprises a polyethylene terephthalate (PET) film, which largely satisfies the above requirements. In one embodiment, the transparent substrate 240 comprises a PET film that is six microns or less in thickness.

The light engine 160 (shown in FIG. 1) forms an image on the screen 122 by directing the scanning laser beam 162 to the phosphor regions 124 and modulating the scanning laser beam 162 to deliver a desired amount of optical energy to each phosphor region 124 of the screen 122. Each phosphor region 124 outputs light for forming a desired image by the emission of visible light created by the selective laser excitation thereof by the scanning laser beam 162. Some of the light emitted by the phosphor region 124 will be incident on the standoff dividers 220, which may absorb and/or transmit said light, depending on the material from which the standoff dividers 220 are formed and the angle of incidence of the light with respect to the surfaces of the standoff dividers 220. Transmission of incident light from the phosphor region 124 into an adjacent phosphor region allows colors from different phosphor regions to mix, thereby degrading color purity of the image, while absorption of such light reduces the amount of light that ultimately reaches the viewer 110. Embodiments of the invention contemplate the use of a material having a low-index of refraction that is disposed in the gap 260 between the phosphor regions 124 and the standoff dividers 220. The presence of the low-index material in gap 260 minimizes the absorption and/or transmission by the standoff dividers 220 of light emitted by the phosphor regions 124, thereby allowing more of the light emitted by the phosphor regions 124 to propagate through the color filter layer 210 and reach the viewer 110.

In another embodiment, the screen 122 may include an optical compensation element to control the angle of incidence of the incoming beam 162. Optical compensation elements include various optical devices that can adjust the direction of the received light, such as layered waveguides, prisms, lenses or other similar devices that can through their geometric shape and/or material properties (e.g., index of refraction) adjust the angle of the light passing there through. In one embodiment, the optical compensation element comprises a Fresnel lens layer 270. A Fresnel lens reduces the amount of material required compared to other optical compensation means, such as a conventional spherical lens, by breaking the lens into a set of concentric annular sections known as Fresnel zones. In each zone, the overall thickness of the lens is decreased, effectively separating the continuous surface of a standard lens into a set of surfaces of the same curvature. A Fresnel lens allows a substantial reduction in thickness, weight, and volume of material when compared to an equivalent spherical lens. Thus, Fresnel lens layer 270 enables control of the angle of incidence of incoming beam 162 on the phosphor regions 124 without the thickness and weight associated with a convention spherical lens system. In one embodiment, Fresnel lens layer 270 is configured to direct incoming beam 162 onto the phosphor regions 124 with a normal or near-normal angle of incidence. It should be noted that the location of the Fresnel lens layer 270 as shown in FIG. 2 is not intended to be limiting as to the scope of the invention, since the Fresnel lens layer 270 could also be positioned on one or more surfaces in the image emission module 120 without deviating from the basic scope of the invention disclosed herein.

In one embodiment, the Fresnel lens layer 270 may be plastic, so it may bend to hold in place the tilettes by bending the outer shell plastic sheets. Additionally, the Fresnel lens layer 270 may be flexible.

In another embodiment, the Fresnel lens layer 270 may be glass and flat, so the final display sandwich cannot be bent to hold the tilettes in place. Alternatively, the bend could be so gradual that the segments of the flat Fresnel lens layer 270 can mate with the slightly curved panel and function as if both are planar.

In yet another embodiment, the Fresnel lens layer 270 may be a glass that is so thin, that a slight bend is permissible. This thin glass Fresnel lens may be used in a monolithic panel. In certain embodiments where there is no panel frame structure for intermediate tiles, the Fresnel lens layer 270 can be positioned close to the panel stack as opposed to designs where thick glass separates the Fresnel lens layer from the panel stack so that the panel frame edges don't block the extreme rays from reaching the panel edges.

The Fresnel lens layer 270 may be the same dimension of as each of the image emission modules or "tilettes"; hence multiple tilettes may be paired with corresponding Fresnel lenses. In another embodiment, the Fresnel lens layer 270 may be sized to the size of two or more tilettes and possibly the size of a whole tilette array.

In one embodiment the Fresnel lens layer 270 may have a PET backing and the tilettes may comprise PET material as well.

In certain embodiments, the screen 122 may further comprises a reflector layer (not shown), such as a glass substrate, that acts as a structural layer of screen 122, reflects visible and UV light toward phosphor regions 124 and viewer 110, and is spaced from the transparent substrate 240 to define a low-index gap. In one embodiment, reflector material is a very thin, co-extruded film. More specifically, multiple sheets of films with different refractive indices may be laminated or fused together to construct a composite sheet as a dichroic layer 245. Exemplary films including a polymeric and non-polymeric material are disclosed in U.S. Pat. Nos. 6,010,751 and 6,172,810 which are incorporated by reference in their entirety as part of the specification of this application. In particular, coextruded multilayer interference filters as taught in U.S. Pat. No. 6,531,230 can provide precise wavelength selection as well as large area in a very thin cost effective manufacturing composite layer set. The entire disclosure of U.S. Pat. No. 6,531,230 is incorporated by reference as part of the specification of this application.

Figure 3:
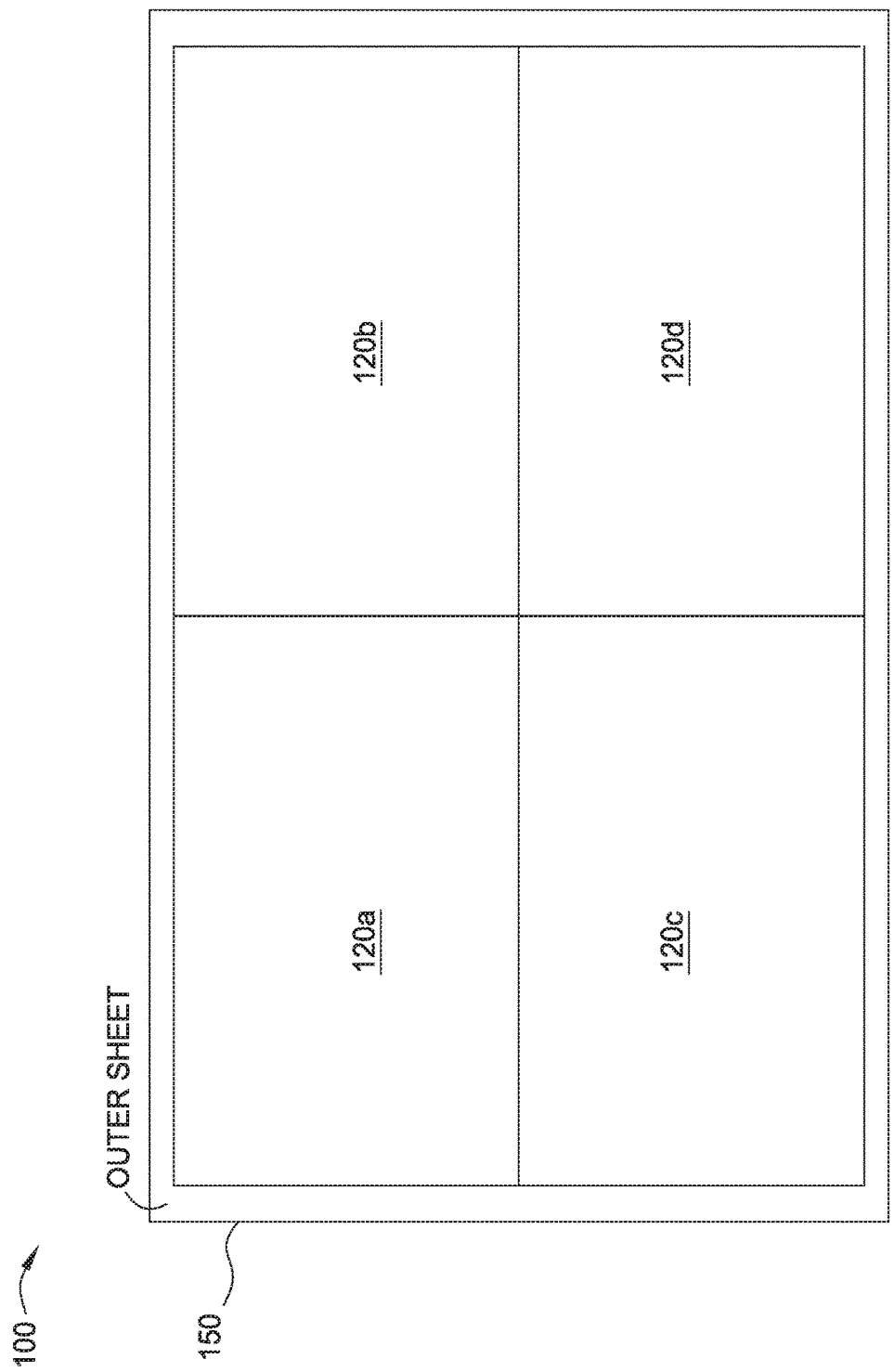
FIG. 3 illustrates a schematic view of one embodiment of the display system of FIG. 1 with a visible light transparent sheet removed according to embodiments described herein.

FIG. 3 illustrates a schematic view of one embodiment of the display system 100 of FIG. 1 with a visible light transparent sheet removed. The display system 100 depicted in FIG. 3 shows a 2×2 arrangement of image emission modules 120a-120d positioned on the second visible light transparent sheet 150 prior to placement of the first visible light transparent sheet 140 over the image emission modules 120a-120d. The plurality of image emission modules 120a-d may be positioned adjacent to each other and the center of the adjacent positioned plurality of image emission modules and the center of the first visible light transparent sheet 140 and the second visible light transparent sheet 150 may be substantially centered to each other. The first visible light transparent sheet 140 and the second visible light transparent sheet 150 may each be of a size greater than an aggregate of the plurality of adjacent image emission modules 120a-d such that the aggregate of the plurality of adjacent image emission modules are within the perimeter boundaries of the first visible light transparent sheet 140 and the second visible light transparent sheet 150.

Figure 4:
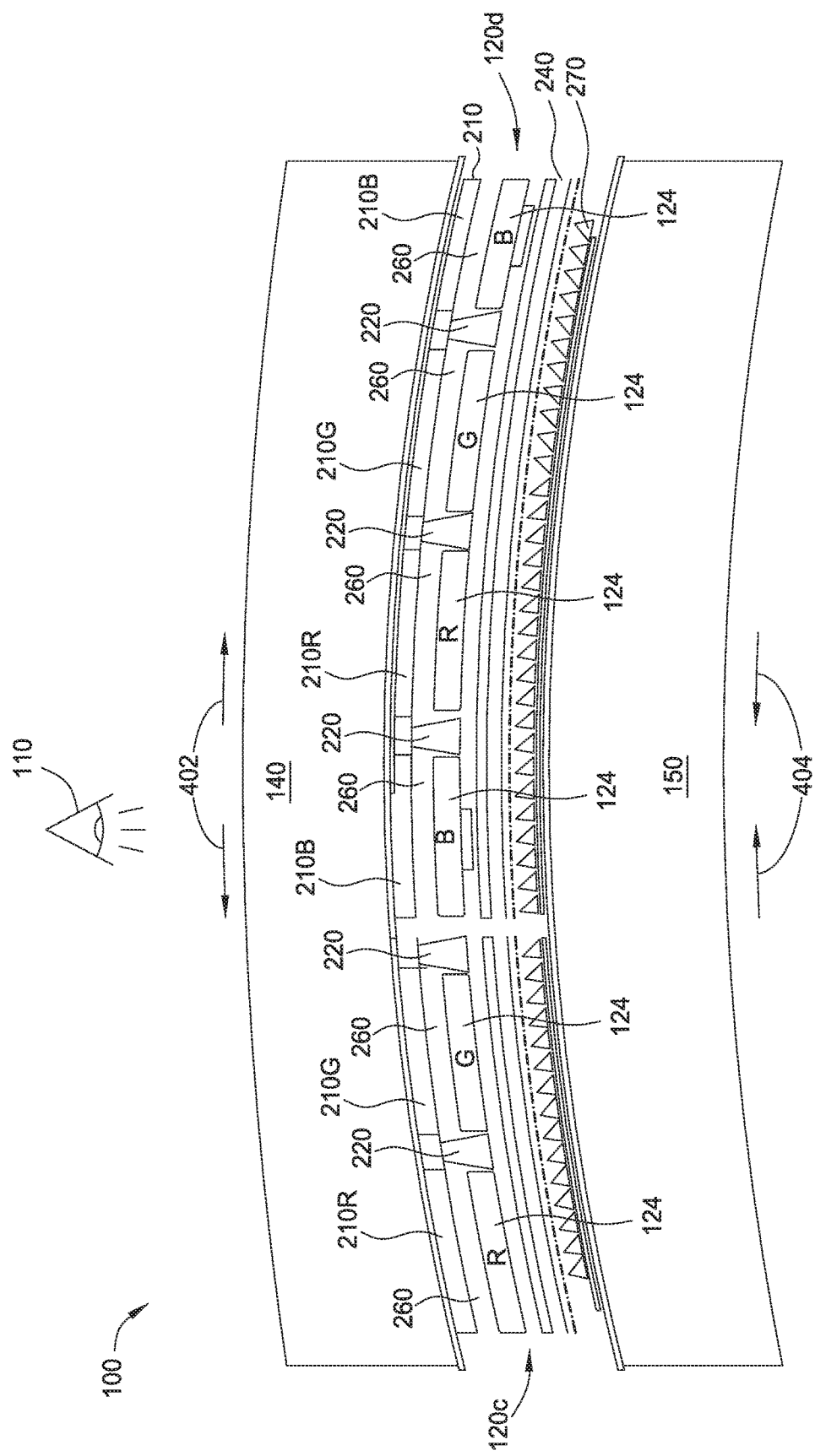
FIG. 4 illustrates a partial cross-sectional view of one embodiment of a display system according to embodiments described herein.
Figure 5:
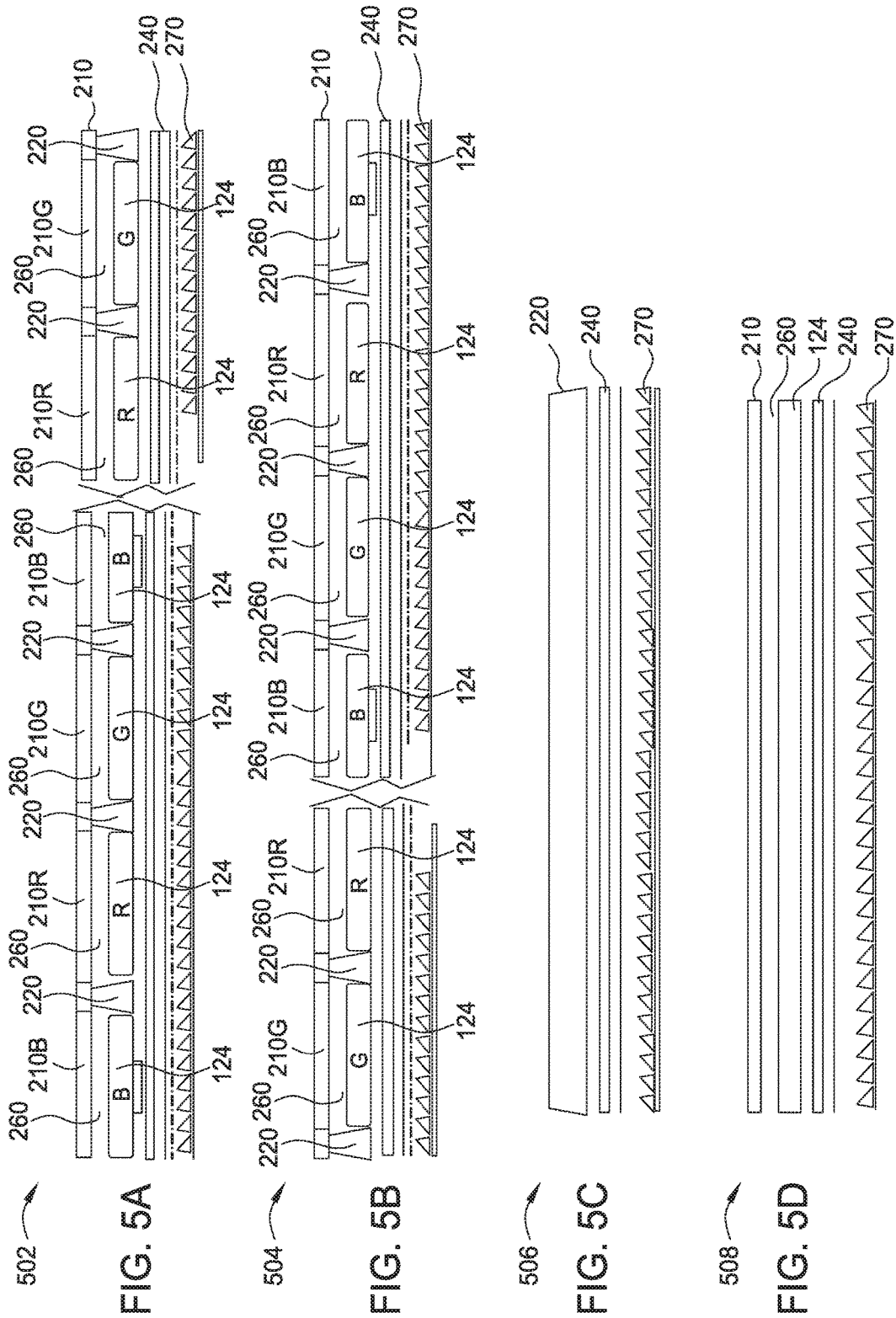
FIGS. 5A-5D illustrate various side views of one embodiment of an image emission module according to embodiments described herein.

FIG. 4 illustrates a partial cross-sectional view of one embodiment of a display system according to embodiments described herein. As depicted in FIG. 4, the display system is bent to have a continuous concave bend thus holding the image emission modules in place. The first visible light transparent sheet 140 and the second visible light transparent sheet 150 are bowed with the first visible light transparent sheet 140 held in tension as shown by arrows 402 and the second visible light transparent sheet 150 held in compression as shown by arrows 404. As the first visible light transparent sheet 140 is held in tension and the second visible light transparent sheet 150 is held in compression a normal load is applied to the image emission modules. In one embodiment, the first visible light transparent sheet 140 and the second visible light transparent sheet 150 are bent to between about 1 degree and about 10 degrees to hold the image emission modules in place. In another embodiment, the first visible light transparent sheet 140 and the second visible light transparent sheet 150 are bent to between about 1 degree and about 5 degrees to hold the image emission modules in place.

Several techniques are contemplated for aligning/attaching non-laminated layer tilettes to the outer acrylic sheets. For example, the tilettes are cut to size with a glass template. In another example, a laser may be used to cut the exact tilette size with vision assist. In yet another example, a mechanical cutting knife may be used to cut the tilette size. The tilettes are then aligned to each other and arrayed in a manner that a side of one tilette abuts an adjacent tilette side.

Several techniques are contemplated to provide uniform tension on the pressed outer layers. In one embodiment, a stiff backing layer is held in a curved track top and bottom and compressed from the edges inward to stiffen the backing plate. Thinner PET based tilettes and outer acrylic sheet layers are pulled around the curved shape to generate compression in of the layers. In another embodiment, the layers are arranged so tension is used in both the backing layer and top layer to accomplish the same goal.

Several characteristics are considered for materials for the outer and inner layers. The material should have the suitable optical clarity, rigidity, toughness, and UV yellowing resistance. The material should also have the suitable stiffness, creep resistance (i.e. slow deformation under constant load), CTE, low anisotropy, low coefficient of humidity expansion. In some instances, the coefficient of friction may be a factor. For example, in one embodiment, the two outer layers allow some "float," so that the "tilettes" do not tear apart with temp/RH cycling.

Several configuration of the phosphor in context of edges of each panel tilettes are contemplated. In one embodiment, the phosphor sheet is flush to all edges. In another embodiment, the overlap of phosphor into the tilette gap. In yet another embodiment, the "tilette" is defined as a subset size of the full display, but including being equal in size to the whole display footprint (i.e. the case where the ribsheet is the full size, and the phosphor (or phosphor/CF) zip into one monolithic sheet (i.e. seams not through all layers). In yet another embodiment, a configuration where seams are staggered, so that the rib sheet and phosphor/CF deliberately do not align (i.e. like brick laying pattern). In yet another embodiment, a configuration of the tilettes are either of different sizes and different spatial arrangement in relation to each other between the sheets 140 and 150 is anticipated.

FIGS. 5A-5D illustrate various side views of one embodiment of an image emission module 120 according to embodiments described herein before the bending of the outer sheets. Each image emission module 120 has four sides. Two of the sides 502, 504 are ends where the phosphor regions 124 cross sections end (at the edge). The third side 506 is a continuous divider side which separates the phosphor regions 124 from each other, and the last side 508 is a continuous strip of phosphor. The image emission modules 120 may be arranged adjacent to each other such that the stripe cross section side is adjacent to another image emission module's stripe cross section side; the image emission module's divider side is adjacent to another image emission module's continuous phosphor stripe side; and the continuous stripe side is adjacent to another image emission module's continuous divider side. It is contemplated that as many image emission modules as needed may be placed adjacent to each other with no limit.

Figure 6:
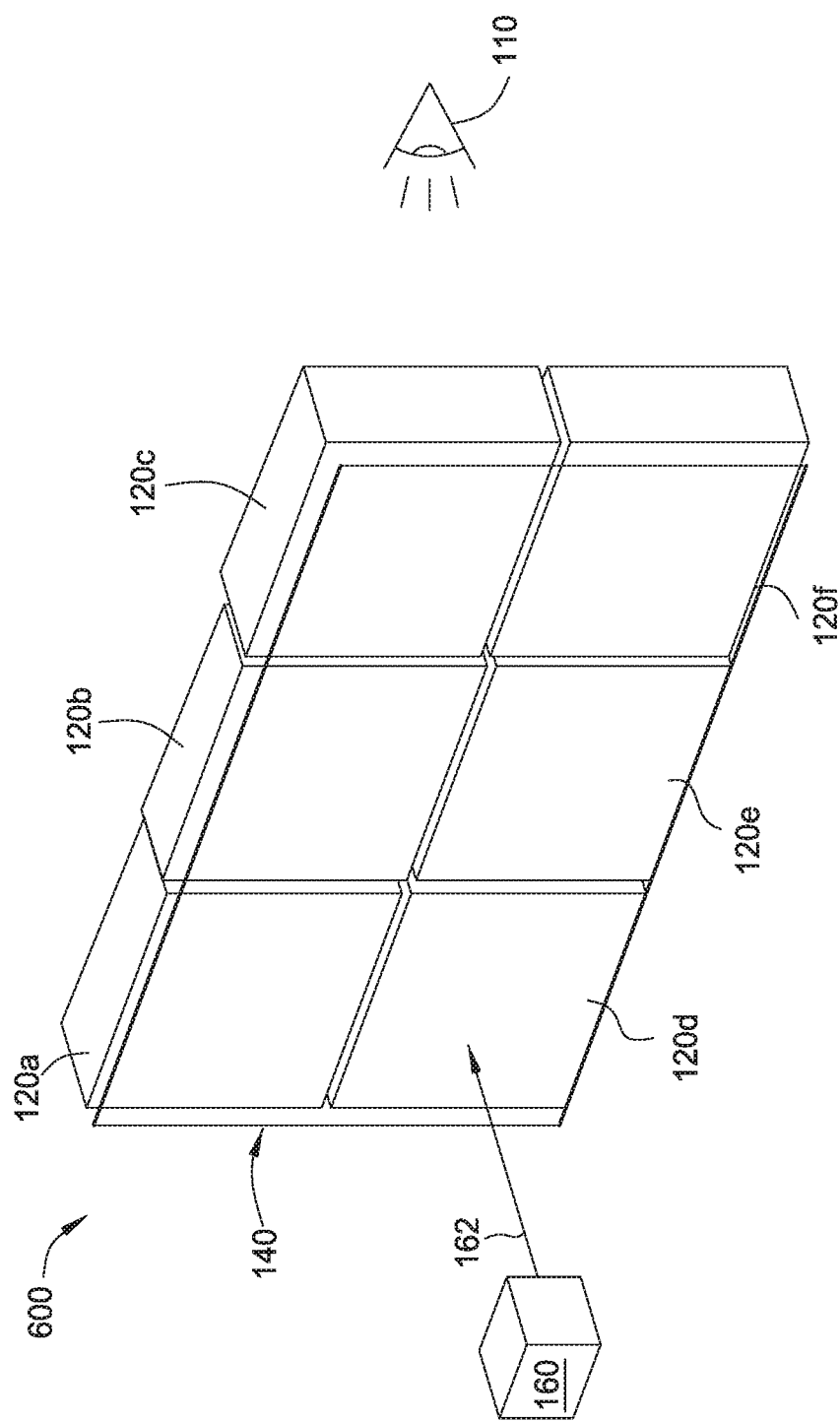
FIG. 6 illustrates a perspective of another embodiment of a display system according to embodiments described herein.

FIG. 6 illustrates a perspective of another embodiment of a display system 600 according to embodiments described herein. As depicted in FIG. 6, the display system 600 comprises six image emission modules 120*a-f* and a first visible light transparent sheet 140 for supporting the plurality of image emission modules 120*a-d* that are arranged to form a single tiled display screen.

Figure 7:
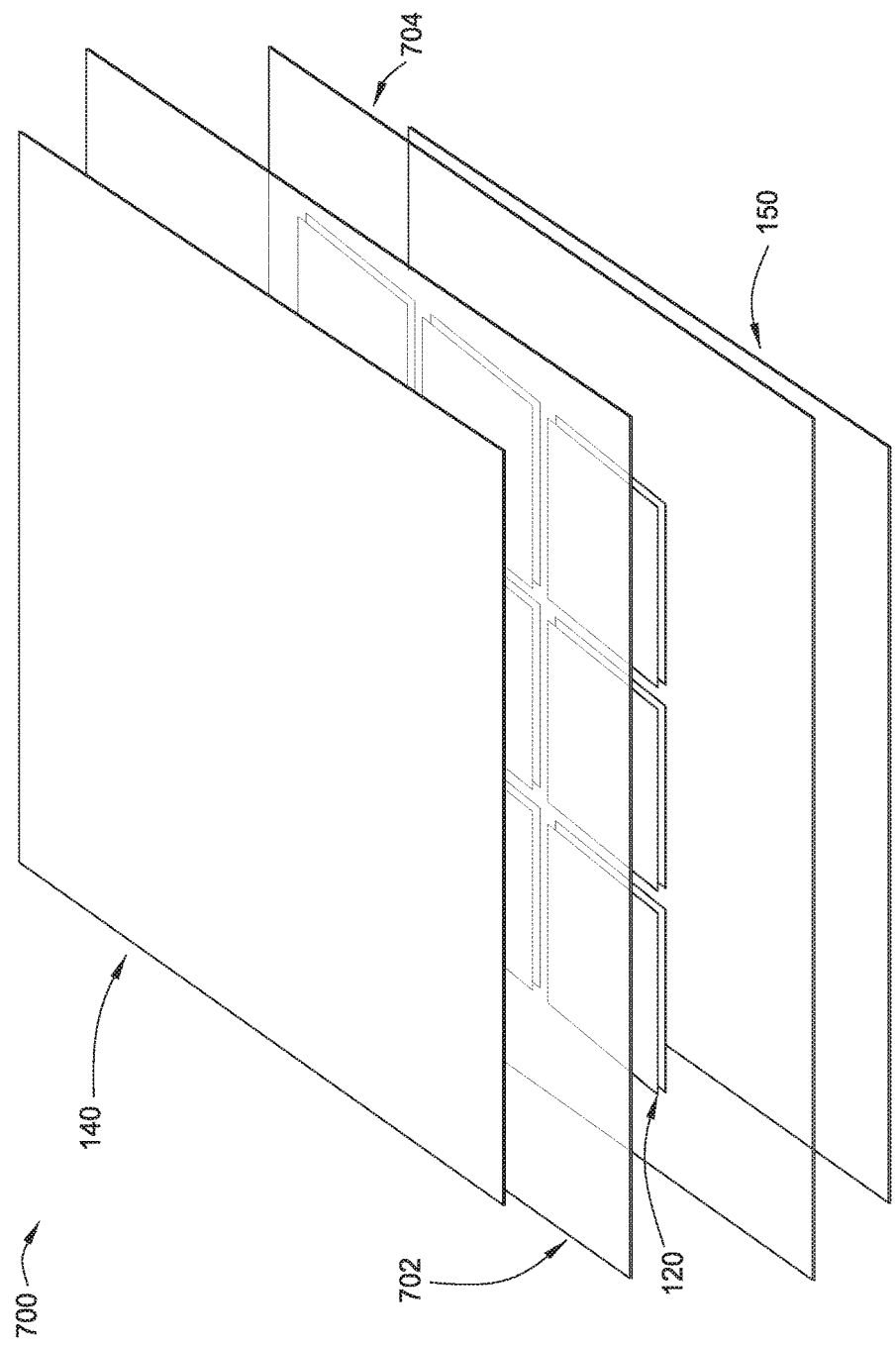
FIG. 7 illustrates an exploded schematic view of another embodiment of a display system according to embodiments described herein.

FIG. 7 illustrates an exploded schematic view of another embodiment of a display system 700 according to embodiments described herein. The display system 700 comprises two outer visible light transparent sheets 140, 150 and two inner visible light transparent sheets 702, 704. The outer visible light transparent sheets 140, 150 may be acrylic sheets and the inner visible light transparent sheets 702, 704 may be PET sheets. The two outer visible light transparent sheets 140, 150 are the same size, but smaller than the two inner visible light transparent sheets 702, 704, but the two outer visible light transparent sheets 140, 150 are wider/longer than the tilette array layer.

One technique to hold the panelettes in place is there are four points that locate the panel stack in x and y such that expansion and contraction occurs from those points out to the edge of the panel. This minimizes the total CTE movement of the panel stack. The clamping is done by the two pieces of acrylic that the panel stack is sandwiched between. When the acrylic pieces are bowed, and one held in tension and the other in compression, it applies a normal load to the panel stack. The panel stack may include two layers, each on a monolithic piece of PET. One is the Fresnel layer (Fresnel lenses, no glass) tiled on a large sheet of PET. The other layer is a large sheet of PET with tiled PET color filter/RGB phosphor/PET servo assemblies.

In one embodiment, the tilette array may have a large PET sheet on either side of the tilette array, wherein the two PET sheets are larger and, hence extend beyond the tilette Fresnel lens array.

In one embodiment, two acrylic sheets may comprise sheets that are of a relatively stiff material and are larger in length and width than the tilette array. The acrylic sheets are located on either side of the tilette array and clamped, thereby holding the tilette array together between the two acrylic sheets. The sheets may be bolted together, clamped together or held together using a slight pressure from the sides, which may cause the acrylic sheets to bow. The bowing will uniformly hold the tilette array in placed.

In one embodiment, two PET sheets may comprise sheets that are of essentially the same material as the tilette array material and which are larger in length and width than the tilette array. The two PET sheets are located on either side of the tilette array and clamped, thereby holding the tilette array together between the two PET sheets. The PET sheets may be pinned together or clamped together.

Two acrylic sheets may be disposed on either side of the two PET sheets, which in turn, are located on either side of the tilette array PET sheets sandwich and clamped, thereby holding the tilette array PET sheets sandwich together between the two acrylic sheets. The acrylic sheets may be of a relatively stiff material and larger in length and width than the tilette array, but smaller in length and width than the PET sheets. The acrylic sheets may be bolted together, clamped together, or held together with a slight pressure from the sides, which may cause the acrylic sheets to bow. The bowing will uniformly hold the tilette array PET sheets sandwich in place.

In one embodiment, the CTE of outer acrylic sheets match at around the inner PET sheets' value of 15-17 ppm/deg C. along the web and cross-web directions. In another embodiment, the outer skins CTE are matched but different from the tilettes, whereby the tilettes are allowed to float within the support acrylic skins.

While the foregoing is directed to embodiments of the present invention, other and further embodiments of the invention may be devised without departing from the basic scope thereof, and the scope thereof is determined by the claims that follow.

The invention claimed is:

1. An apparatus comprising:
  a plurality of image emission modules each comprising:
    multiple phosphor regions, wherein at least one phosphor region emits light of a first color when excited and at least one phosphor region emits light of a second color when excited;
    a plurality of light engines, wherein each light engine generates one or more excitation beams to excite the multiple phosphor regions of a corresponding image emission module and the multiple phosphor regions of one or more image emission modules adjacent to the corresponding image emission module;
  a visible light transparent support structure comprising:
    a first visible light transparent sheet wherein the plurality of image emission modules are placed upon the first visible light transparent sheet; and
    a dichroic filter layer positioned in contact with the first visible light transparent sheet.

2. The apparatus of claim 1, wherein the first visible light transparent sheet is bowed.

3. The apparatus of claim 2, wherein the first visible light transparent sheet is held in compression to form a continuous concave bend.

4. The apparatus of claim 2, wherein the first visible light transparent sheet is held in tension to form a continuous concave bend.

5. The apparatus of claim 2, wherein the bowed first visible light transparent sheet applies a normal load to the plurality of image emission modules.

6. The apparatus of claim 2, wherein the plurality of image emission modules are positioned adjacent to each other and the center of the adjacent positioned plurality of image emission modules and a center of the first visible light transparent sheet are substantially centered to each other.

7. The apparatus of claim 6, wherein the first visible light transparent sheet is of a size greater than an aggregate of the plurality of adjacent image emission modules such that the aggregate of the plurality of adjacent image emission modules are within a perimeter boundary of the first visible light transparent sheet.

8. The apparatus of claim 7, wherein the plurality of image emission modules further comprise a first transparent substrate on which the multiple phosphor regions are mounted.

9. The apparatus of claim 8, wherein the plurality of image emission modules further comprise a second transparent substrate configured with color filter elements.

10. The apparatus of claim 9, wherein the plurality of image emission modules further comprise divider members that separate the multiple phosphor regions, and the divider members have walls that are angled with respect to a transparent substrate to which the multiple phosphor regions are mounted.

11. The apparatus of claim 1, wherein the plurality of image emission modules are positioned adjacent to each other and the center of the adjacent positioned plurality of image emission modules and a center of the first visible light transparent sheet are substantially centered to each other.

12. The apparatus of claim 11, wherein the first visible light transparent sheet is of a size greater than an aggregate of the plurality of adjacent image emission modules such that the aggregate of the plurality of adjacent image emission modules are within a perimeter boundary of the first visible light transparent sheet.

13. The apparatus of claim 1, wherein the plurality of image emission modules further comprises a coextruded dichroic layer that passes excitation light in a first direction and filters visible light in a second direction.

14. The apparatus of claim 1, wherein the first visible light transparent sheet is selected from materials comprising poly(methyl methacrylate) (PMMA) and polycarbonate acrylic.

15. The apparatus of claim 1, wherein the first visible light transparent sheet has a thickness selected from about 1.0 millimeter to about 6.0 millimeters.

16. The apparatus of claim 15, wherein the first visible light transparent sheet has a thickness from about 1.5 millimeters to about 3.0 millimeters.

17. The apparatus of claim 1, wherein the apparatus has a concave bend angle of five degrees or less.

18. The apparatus of claim 1, wherein the plurality of image emission modules further comprise a first transparent substrate on which the multiple phosphor regions are mounted.

19. The apparatus of claim 18, wherein the plurality of image emission modules further comprise a second transparent substrate configured with color filter elements.

20. The apparatus of claim 19, wherein the plurality of image emission modules further comprise divider members that separate the multiple phosphor regions, and the divider members have walls that are angled with respect to a transparent substrate to which the multiple phosphor regions are mounted.

* * * * *